(12) United States Patent
Birnbrich et al.

(10) Patent No.: US 9,056,960 B2
(45) Date of Patent: Jun. 16, 2015

(54) USE OF NANOPOROUS POLYMER FOAMS AS HEAT-INSULATING MATERIALS

(75) Inventors: Paul Birnbrich, Solingen (DE); Hans-Josef Thomas, Korschenbroich (DE); Dagmar Stahlhut-Behn, Düsseldorf (DE)

(73) Assignee: Cognis IP Management GmbH, Duesseldorf (DE)

( * ) Notice: Subject to any disclaimer, the term of this patent is extended or adjusted under 35 U.S.C. 154(b) by 182 days.

(21) Appl. No.: 13/698,083

(22) PCT Filed: Feb. 18, 2011

(86) PCT No.: PCT/EP2011/000788
§ 371 (c)(1),
(2), (4) Date: Nov. 15, 2012

(87) PCT Pub. No.: WO2011/144268
PCT Pub. Date: Nov. 24, 2011

(65) Prior Publication Data
US 2013/0062551 A1 Mar. 14, 2013

(30) Foreign Application Priority Data

May 18, 2010 (EP) .................................... 10005165

(51) Int. Cl.
| | | |
|---|---|---|
| *C08J 9/28* | (2006.01) | |
| *C09K 3/00* | (2006.01) | |
| *F16L 59/14* | (2006.01) | |
| *F16L 58/14* | (2006.01) | |
| *C08G 59/18* | (2006.01) | |
| *C08G 59/22* | (2006.01) | |
| *C08G 59/50* | (2006.01) | |
| *C08J 9/00* | (2006.01) | |
| *C09K 3/10* | (2006.01) | |

(52) U.S. Cl.
CPC *C08J 9/283* (2013.01); *C08J 9/286* (2013.01); *C09K 2003/1078* (2013.01); *F16L 58/14* (2013.01); *C08G 59/184* (2013.01); *C08G 59/226* (2013.01); *C08G 59/502* (2013.01); *C08J 9/0061* (2013.01); *C08J 2363/00* (2013.01); *C08J 2463/00* (2013.01)

(58) Field of Classification Search
None
See application file for complete search history.

(56) References Cited

U.S. PATENT DOCUMENTS

| 4,828,771 | A | * | 5/1989 | Kishima et al. ................. 264/41 |
|---|---|---|---|---|
| 7,300,963 | B2 | | 11/2007 | Birnbrich et al. |
| 8,207,237 | B2 | * | 6/2012 | Birnbrich et al. ............... 521/65 |
| 8,217,088 | B2 | * | 7/2012 | Birnbrich et al. ............... 521/65 |
| 8,598,243 | B2 | * | 12/2013 | Birnbrich et al. ............... 521/65 |
| 8,664,285 | B2 | * | 3/2014 | Birnbrich et al. ............... 521/68 |
| 2007/0173553 | A1 | * | 7/2007 | Taylor, Jr. ........................ 521/99 |

FOREIGN PATENT DOCUMENTS

| DE | 3730823 | 3/1988 |
|---|---|---|
| EP | 1518875 | 3/2005 |
| WO | WO-2007/095730 | 8/2007 |

OTHER PUBLICATIONS

"PCT International Search Report for PCT/EP2011/000788", May 19, 2011 , 2 pages.

* cited by examiner

*Primary Examiner* — Robert Sellers
(74) *Attorney, Agent, or Firm* — Servilla Whitney LLC

(57) ABSTRACT

A method of thermally insulating a transport means or an industrial or plant construction comprises obtaining a nanoporous foam (NP1) by reacting epoxy resin(s) (E) with amphiphilic epoxy resin hardener(s) (H) in water by a phase inversion polymerization wherein the binder content during polymerization is from 15% to 39.9% by weight, and installing the nanoporous polymer foam as a thermal insulation material in transport means or in an industrial or plant construction.

13 Claims, No Drawings

USE OF NANOPOROUS POLYMER FOAMS AS HEAT-INSULATING MATERIALS

CROSS-REFERENCE TO RELATED APPLICATIONS

This application is the national stage entry of PCT/EP2011/000788, filed on Feb. 18, 2011, which claims priority to European Application No. 10005165.5, filed on May 18, 2010, the disclosures of which are incorporated herein by reference in their entireties.

FIELD OF THE INVENTION

The invention relates to the use of particular nanoporous polymer foams as thermal insulation materials.

PRIOR ART

Polymeric epoxy resins have been known for a long time. They are generally produced by reacting polyepoxides having an average of at least two terminal or lateral epoxide groups per molecule with hardeners, in particular amine hardeners which are diamines or polyamines. These polymeric epoxy resins have a variety of applications, with use as paints and varnishes and coating compositions (application of a covering layer to a substrate) dominating.

EP-A-1,518,875 describes specific hardeners for water-based epoxy resin systems, where these hardeners can be obtained by reacting a mixture of (a) at least one epoxidized polyalkylene oxide selected from the group consisting of epoxidized polyethylene oxides, epoxidized polypropylene oxides and polyethylene-propylene oxides, (b) at least one epoxidized aromatic hydroxyl compound selected from the group consisting of bisphenol A epoxides and bisphenol F epoxides and (c) at least one aromatic hydroxyl compound selected from the group consisting of bisphenol A and bisphenol F to form an intermediate and subsequently reacting this intermediate with a polyamine. The use of these hardeners for producing clear varnishes and coating compositions (application of a covering layer to a substrate, for example for floor coatings) is also disclosed.

DESCRIPTION OF THE INVENTION

It was an object of the present invention to provide nanoporous polymer foams which are suitable as thermal insulation materials. In particular, these materials should have a low thermal conductivity (preferably below 0.06 W/m*K) and a high mechanical strength (maximum compressive stress preferably above 0.3 MPa).

The present invention firstly provides for the use of nanoporous polymer foams (NP1) which can be obtained by reacting one or more epoxy resins (E) with one or more amphiphilic epoxy resin hardeners (H) in water in a phase inversion polymerization (PIP), with the proviso that the binder content of the polymer foams is in the range from 15 to 39.9% by weight, as thermal insulation materials in transport means and in industrial and plant construction. The binder content of the polymer foams is preferably in the range from 15 to 35% by weight and in particular from 20 to 30% by weight.

As indicated above, the use according to the invention is aimed at the thermal insulation materials in transport means and in industrial and plant construction. Examples of transport means are automobiles, ships, aircraft, rail vehicles and the like, while examples of industrial and plant construction are containers, vessels, pipes, heating systems, solar plants and the like. The field of thermal insulation systems for the insulation of buildings is expressly excluded, i.e. is not counted in the use according to the invention.

For the purposes of the present invention, nanoporous polymer foams are polymers which have internal voids. These are sponge-like structures which have both macropores and micropores, with the micropores dominating and the micropores having average cross sections in the range from 10 to 500 nm and in particular from 10 to 100 nm.

For the purposes of the present invention, the "binder content" of the nanoporous polymer foams is the content of binder in the nanoporous polymer foams. Here, binder is, for the purposes of the present patent application, the reaction product of hardener (H) and epoxy resin (E). The binder content is accordingly the percentage of the binder defined in this way in the total polymer foam system.

The nanoporous polymer foams (NP1) to be used according to the invention have a low thermal conductivity combined with a high mechanical strength. This makes the materials particularly attractive for use as structural, mechanically load-bearing thermal insulation materials.

The Epoxy Resins (E)

The epoxide compounds (E) are polyepoxides having an average of at least two terminal or lateral epoxide groups per molecule. These epoxide compounds can be either saturated or unsaturated and also aliphatic, cycloaliphatic, aromatic or heterocyclic and can also have hydroxyl groups. They can also comprise substituents which do not cause any interfering secondary reactions under the mixing and reaction conditions, for example alkyl or aryl substituents, ether groups and the like.

These epoxide compounds are preferably polyglycidyl ethers based on polyhydric, preferably dihydric alcohols, phenols, hydrogenation products of these phenols and/or of novolacs (reaction products of monohydric or polyhydric phenols with aldehydes, in particular formaldehyde, in the presence of acid catalysts).

The epoxide equivalent weights of these epoxide compounds are preferably in the range from 85 to 3200, in particular from 170 to 830. The epoxide equivalent weight of a substance is the amount of the substance (in gram) which comprises 1 mol of oxirane rings.

As polyhydric phenols, preference is given to the following compounds: resorcinol, hydroquinone, 2,2-bis(4-hydroxyphenyl)-propane (bisphenol A), isomer mixtures of dihydroxydiphenylmethane (bisphenol F), tetrabromobisphenol A, 4,4'-dihydroxy-diphenylcyclohexane, 4,4'-dihydroxy-3,3-dimethyldiphenyl-propane, 4,4'-dihydroxybiphenyl, 4,4'-dihydroxybenzophenon, 1,1-bis(4-hydroxyphenyl)ethane, 1,1-bis(4-hydroxyphenyl)-isobutane, bis(4-hydroxyphenyl)methane, bis(4-hydroxyphenyl)ether, bis(4-hydroxyphenyl)sulfone, etc., and also the chlorination and bromination products of the above-mentioned compounds; bisphenol A is very particularly preferred.

The polyglycidyl ethers of polyhydric alcohols are also suitable as compounds (E). Examples of such polyhydric alcohols are ethylene glycol, diethylene glycol, triethylene glycol, 1,2-propylene glycol, polyoxypropylene glycols (n=1-20), 1,3-propylene glycol, 1,4-butylene glycol, 1,5-pentanediol, 1,6-hexanediol, 1,2,6-hexanetriol, glycerol, isosorbide and 2,2-bis(4-hydroxycyclohexyl)propane.

It is also possible to use polyglycidyl ethers of polycarboxylic acids as compounds (F); these are obtained by reacting epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

It is also possible to use mixtures of a plurality of epoxide compounds (E).

In the production of nanoporous polymer foams (NP1) in which, as indicated above, the hardeners (H) according to the invention are reacted in aqueous medium with epoxide compounds (E) in a phase inversion polymerization (PIP), additional additives and/or processing aids known for this purpose to a person skilled in the art can optionally be used. Examples are pigments, cement, gravel, deaerators, antifoams, dispersants, antisedimentation agents, accelerators, free amines, leveling additives, conductivity improvers.

The Epoxy Resin Hardeners (H)

For the purposes of the present invention, amphiphilic epoxy resin hardeners (H) are epoxy resin hardeners which have hydrophilic and hydrophobic structural elements.

Preference is given to using amphiphilic epoxy resin hardeners which are self-emulsifying in water at 25° C. and are also able to emulsify epoxy resins (E) in water at 25° C.

Preference is given to using hardeners (H) which can be obtained by reacting a mixture comprising
(A) at least one epoxidized polyalkylene oxide selected from the group consisting of epoxidized polyethylene oxides, epoxidized polypropylene oxides and polyethylenepropylene oxides,
(B) at least one epoxidized aromatic hydroxyl compound selected from the group consisting of bisphenol A epoxides and bisphenol F epoxides and
(C) at least one aromatic hydroxyl compound selected from the group consisting of bisphenol A and bisphenol F
to form an intermediate and subsequently reacting this intermediate with a polyamine (P).

In an embodiment, exclusively the components (A), (B) and (C) are reacted to form the intermediate and the latter is reacted further with a polyamine (P).

In a further embodiment, the intermediate which is subsequently reacted with the polyamines (P) to form the hardener is prepared using the compounds (D) in addition to the compounds (A), (B) and (C). The compounds (D) are compounds selected from the group consisting of triglycidyl ethers of triols and diglycidyl ethers of diols. Examples of suitable diols and triols on which the compounds (D) can be based are: ethylene glycol, diethylene glycol, triethylene glycol, 1,2-propylene glycol, 1,3-propylene glycol, 1,4-butylene glycol, 1,5-pentanediol, 1,6-hexanediol, cyclohexanediol, cyclohexanedimethanol, neopentyl glycol, 1,2,6-hexanetriol, glycerol and trimethylolpropane.

The Compounds (A)

For the purposes of the invention, epoxidized polyethylene oxides are compounds which can be obtained by converting the two terminal OH groups of polyethylene oxide into oxirane groups, for example by reaction with epichlorohydrin. The polyethylene oxide used can have an average molecular weight in the range from 80 to 3000; it can be prepared by starting the polymerization of ethylene oxide on an alkylenediol having from 2 to 18 carbon atoms in the manner known to those skilled in the art.

For the purposes of the invention, epoxidized polypropylene oxides are compounds which can be obtained by converting the two terminal OH groups of polypropylene oxide into oxirane groups, for example by reaction with epichlorohydrin. The polypropylene oxide used can have an average molecular weight in the range from 110 to 3000; it can be prepared by starting the polymerization of the propylene oxide on an alkylenediol having from 2 to 18 carbon atoms in the manner known to those skilled in the art.

For the purposes of the invention, polyethylene-propylene oxides are compounds which can be obtained by converting the two terminal OH groups of polyethylene-propylene oxide into oxirane groups, for example by reaction with epichlorohydrin. The polyethylene-propylene oxide used can have an average molecular weight in the range from 80 to 3000. For the purposes of the present invention, the term polyethylenepropylene oxide refers to compounds which can be obtained by copolymerization of ethylene oxide and propylene oxide, with the polymerization of the two reactants being able to be carried out simultaneously or blockwise and the polymerization of the propylene oxide and/or ethylene oxide being started on an alkylenediol having from 2 to 18 carbon atoms in the manner known to those skilled in the art.

The compounds (A) can be used individually or in admixture with one another.

The Compounds (B)

For the purposes of the invention, bisphenol A epoxides are, as is generally customary, compounds which can be obtained by reacting bisphenol A with epichlorohydrin and/or polymerizing this by further reaction with bisphenol A. These compounds are therefore also known as bisphenol A diglycidyl ethers or generally as epoxy resins. Commercial products are Epikote 828, 1001, 1002, 1003, 1004, etc., from Shell.

The molecular weights of the bisphenol A epoxides used are preferably in the range from 380 to 3000.

For the purposes of the invention, bisphenol F epoxides are, as is generally customary, compounds which can be obtained by reacting bisphenol F with epichlorohydrin and/or polymerizing this by further reaction with bisphenol F. These compounds are therefore also known as bisphenol F diglycidyl ethers or generally as bisphenol F epoxy resins.

The molecular weights of the bisphenol F epoxides used are preferably in the range from 350 to 3000.

The compounds (B) can be used individually or in admixture with one another.

The Compounds (C)

Bisphenol A is adequately known to those skilled in the art and is represented by the following formula:

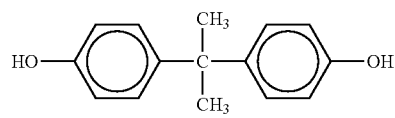

bisphenol A

Bisphenol F is likewise adequately known to those skilled in the art.

The compounds (C) can be used individually or in admixture with one another.

The Compounds (P)

Polyamines (P) used for the purposes of the present invention are primary and/or secondary amines having at least two nitrogen atoms and at least two active amino hydrogen atoms per molecule. It is possible to use aliphatic, aromatic, aliphatic-aromatic, cycloaliphatic and heterocyclic diamines and polyamines. Examples of suitable polyamines (P) are: polyethylenamines (ethylenediamine, diethylenetriamine, triethylenetetramine, tetraethylenepentamine, etc.), 1,2-propylenediamine, 1,3-propylenediamine, 1,4-butanediamine, 1,5-pentanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis(3-aminopropyl)amine, N,N'-bis(3-aminopropyl)-1,2-ethanediamine, N-(3-aminopropyl)-1,2-ethanediamine, 1,2-diaminocyclohexane, 1,3-diaminocyclohexane, 1,4-diaminocyclohexane, aminoethylpiperazines, poly-(alkylene oxide)diamines and triamines, (e.g. Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, Jeffamine ED-2001), metaxylylenediamine, phenylenediamine, 4,4'-diaminodiphenylmethane, toluenediamine, isophoronediamine, 3,3'-dimethyl-4,4'-diaminodicyclohexylmethane, 4,4'-diaminodicyclohexylmethane, 2,4'-diaminodicyclohexylmethane, 1,3-bis(aminomethyl)cyclohexane, the mixture of poly(cyclohexylaromatic) amines linked via a methylene bridge (also known as MBPCAA) and polyaminoamides. Polyethyleneamines, in particular diethylenetriamine, are particularly preferred.

The compounds (P) can be used individually or in admixture with one another.

Preparation of the Intermediate

In an embodiment, the intermediate is prepared using the compounds (A) and (B) in a molar ratio of from 0.1:1 to 5:1.

In an embodiment, the intermediate is prepared using a molar ratio of the sum of the compounds (A) and (B) (these compounds each comprise two oxirane groups per molecule) to compound C (this compound comprises two OH groups per molecule) in the range from 1.1:1 to 10:1. In other words, the ratio of equivalents of oxirane rings in the sum of the compounds (A) and (B) to reactive hydrogen atoms of the compound (C) is set to a value in the range from 1.1:1 to 10:1.

In a further embodiment, namely in cases where at least one compound (D) is also used during the course of the preparation of the hardener, a molar ratio of the sum of the compounds (A), (B) and (D) (these compounds each comprise two oxirane groups per molecule) to compound C (this compound comprises two OH groups per molecule) in the range from 1.1:1.0 to 10.0:1.0 is set during the preparation of the intermediate. In other words, the ratio of equivalents of oxirane rings in the sum of the compounds (A), (B) and (D) to reactive hydrogen atoms of the compound (C) is set to a value in the range from 1.1:1.0 to 10.0:1.0.

In the interests of clarity, we offer the following explanation: A person skilled in the art will be familiar with the expression "ratio of equivalents". The fundamental concept underlying the term equivalent is that the reactive groups on a substance participating in a reaction which participate in the desired reaction are considered. The reporting of a ratio of equivalents expresses the numerical ratio of the totality of the reactive groups of the compounds (x) and (y) used. Here, it has to be noted that for the present purposes a reactive group is the smallest possible group capable of reacting; the term reactive group is thus not equivalent to the term functional group. In the case of H-acid compounds, this means, for example, that although OH groups or NH groups are such reactive groups, $NH_2$ groups in which two reactive H atoms are located on the same nitrogen atom are not. Here, the two hydrogen atoms within the functional group $NH_2$ are regarded as reactive group, so that the functional group $NH_2$ has two reactive groups, namely the hydrogen atoms.

In an embodiment, the preparation of the intermediate is carried out in the presence of a catalyst, in particular triphenylphosphine or ethyltriphenylphosphonium iodide. Here, the amount of the catalyst is from about 0.01 to 1.0% by weight, based on the total amount of the compounds (A), (B) and (C).

The epoxide number (% EpO) of the intermediate is preferably below 10% EpO, in particular below <5% EpO. The definition of the epoxide number and the details regarding the analytical determination can be found in the examples section of the present patent application.

Preparation of the Hardener (H)

As indicated above, the hardener is prepared by reacting the intermediate with a polyamine (P).

In an embodiment, the intermediate and the polyamine (P) are used in such amounts that the ratio of equivalents of the reactive H atoms on the amino nitrogen atoms of (P) to the oxirane groups in the intermediate is in the range from 4:1 to 100:1.

The reaction of the intermediate with the polyamine is preferably carried out with an excess of the polyamine being initially charged, so that it is ensured that essentially 1 molecule of the polyamine, preferably diethylenetriamine, reacts in each case with one of the epoxide groups of the intermediate compound. Excess amine can be distilled off in order to keep the content of free amine as low as possible.

The Phase Inversion Polymerization (PIP)

For the purposes of the present invention, a phase inversion polymerization (PIP) is as follows: An aqueous emulsion of the epoxy resin (E) in water is firstly produced, with the amphiphilic epoxy resin hardener (H) functioning as emulsifier. This system, hereinafter also referred to as reaction system, is initially an oil-in-water emulsion (O/W emulsion). The oil component of this O/W emulsion is of course the epoxy resin.

During the subsequent reaction of resin and hardener (curing in the sense of a polyaddition), a phase inversion occurs, i.e. the reaction system changes from an emulsion of the O/W type to one of the W/O type in which water is enclosed as disperse phase by the curing polymer. This is due to the fact that the original emulsifier properties of the hardener change during the course of curing since the hardener becomes increasingly hydrophobic due to the polyaddition.

After complete curing, a porous polymer matrix which comprises the water phase in the cavities of the organic matrix is present. The water phase can, if desired, be removed by drying, forming air-filled cavities. A necessary condition for this is that a phase inversion polymerization has taken place and that no water can escape from the reaction system. This can be realised industrially in various ways.

Firstly, the reaction system can be introduced into a closed mold. It is also possible to introduce the reaction system into an open system and then, for example, ensure that (a) there is sufficient atmospheric humidity present at the interface to the gas phase (usually surrounding air) to prevent drying of or loss of water from the upper layer of the reaction system or that (b) the interface to the gas phase is covered, for example by a polymer film.

While the above-described variants for carrying out the PIP are loss-free embodiments, there is a further variant for carrying out the PIP in which although the reaction system is introduced into an open system, no particular precautions are taken to prevent loss of water from the interface to the gas phase. In this case, a dense, chemicals-resistant structure (which can be referred to as clear varnish) is formed at this interface by loss of water and forms a water barrier for the part of the reaction system located underneath, so that the PIP can take place unhindered in this. After complete curing of the reaction system, the dense, chemicals-resistant layer (which is generally from 0.1 to 0.3 mm thick) can then be removed by mechanical means.

It can be seen visually that the cured systems are nanoporous structures from the fact that the materials obtained are not clear but white.

In a preferred embodiment, the PIP is carried out using the epoxy resin (E) and the hardener (H) in a ratio of equivalents of from 2:1 to 1:2. Here, ratios of equivalents of (E) to (H) of 1:1 are particularly preferred.

The PIP is characterized by an initial phase in which an O/W emulsion is present and a curing phase whose commencement is indicated by the formation of the W/O emulsion. The PIP can be carried out at an atmospheric humidity of from 0 to 100%. The water content of the PIP reaction system can be varied in the range from 95 to 20% by weight (based on the total reaction system).

If desired, thickeners can also be added to the reaction system.

Curing of the reaction system can be carried out in a wide temperature range, preferably from 1° C. to 99° C. and in particular from 5° C. to 60° C.

In a preferred embodiment, a pulverulent nanoporous polymer foam (NP2) is added during the phase inversion polymerization in the production of the nanoporous polymer foam (NP1) to be used according to the invention, where the pulverulent nanoporous polymer foam (NP2) can be obtained by reaction of one or more epoxy resins (E) with an amphiphilic epoxy resin hardener (H) in water in a phase inversion polymerization and subsequent conversion into the powder form. This embodiment clearly means that a pulverulent nanoporous polymer foam (NP2) is produced first and is then introduced in powder form, optionally moistened with water, during the phase inversion polymerization in the course of the production of the nanoporous polymer foam (NP1), so that some "NP2 islands" are embedded in an "NP1 matrix" in the resulting polymer foam. The binder content of the "NP2 islands" is preferably lower than that of the "NP1 matrix"; the advantage of this specific configuration is that this procedure gives a composite which can be referred to as organic nanofoam in an organic nanofoam and makes it possible to set a combination of the key properties thermal conductivity and mechanical strength which is optimum for the intended use.

The invention further provides a nanoporous polymer foam (NP1) which can be obtained by reacting one or more epoxy resins with an amphiphilic epoxy resin hardener in water in a phase inversion polymerization, where a pulverulent nanoporous polymer foam (NP2) is introduced during the phase inversion polymerization in the production of the nanoporous polymer foam, where the pulverulent nanoporous polymer foam (NP2) can be obtained by reaction of one or more epoxy resins with an amphiphilic epoxy resin hardener in water in a phase inversion polymerization and subsequent conversion into the powder form, with the proviso that the binder content of the polymer foam is in the range from 15 to 39.9% by weight.

In an embodiment, the nanoporous polymer foams (NP1) of the invention comprise substances which improve the fire retardant properties. This can be achieved by integrating further substances into the nanoporous polymer foams, which can particularly advantageously be done during the course of the phase inversion polymerization. An example of such suitable flame retardant additives is the flame retardant VP 5453/4 from Cognis.

In an embodiment, one or more additives selected from the group consisting of flame retardant additives, hydrophobicizing agents and biocides are integrated into the nanoporous polymer foams (NP1).

EXAMPLES

Abbreviations

In the following:
EEW=epoxide equivalent weight (as described above)
MW=average molecular weight
RPM=revolutions per minute
%=percent by weight, unless explicitly indicated otherwise Raw Materials Used
Epoxy resin (E): Chem Res E20 (Cognis GmbH)
Hardener (H): the following hardener H1 was prepared:

Hardener H1

44 g of poly(propylene glycol) diglycidyl ether (EEW: 326 and MW: 652) were mixed at 20 degrees celsius with 46.2 g of bisphenol A diglycidyl ether (Chemres E20 from Cognis EEW: 194), 14.0 g of bisphenol A and 0.1 g of triphenylphosphine. The mixture obtained in this way was heated to 160° C. and stirred at this temperature for about 3.5 hours until the epoxide number was 3.95%. It was subsequently cooled to 60° C. and 121.4 g of diethylenetriamine were added at this temperature. After the exothermic reaction had abated, the reaction mixture was again heated at 160° C. for 2 hours.

The excess of diethylenetriamine was distilled off under reduced pressure (to a temperature at the bottom of 200° C. and pressures of less than 10 mbar) until no more free amine distilled over. The mixture was subsequently cooled to 90° C. and admixed with 89.5 g of water while stirring well.

This gave 205.6 g of a clear amber-colored liquid having a viscosity (neat, Brookfield, 10 rpm, 40° C.) of 2140 mPas, a solids content of 60% and an amine number of 134.

Use Examples 1 to 3

Epoxy resins (E) and hardener (H) were placed in a stirred beaker (diameter 95 mm, height 120 mm) and preemulsified by means of a Pendraulik stirrer model LM34 at setting 1 (about 465 revolutions/minute). The amount of (E) and (H) used are shown in table 1. A homogeneous white coloration indicated appropriate homogenization. Water (the respective amount of water is shown in table 1) was subsequently added in portions. The stirrer speed was set so that there was just no formation of a clot. The total time from preemulsification to processing was about 7 minutes. All experiments were carried out using a ratio of equivalents of epoxy resin to hardener of 1:1.

To produce the combination materials of NP2 in NP1, a material having the lower binder content was firstly made up and cured covered so as to avoid evaporation of water in a Teflon mold. The curing time was 24 hours at 55° C. Drying was concluded after 48 hours at 55° C. The material was comminuted and moistened with water as indicated in example 2 and subsequently carefully stirred into an emulsion having a higher binder content. The emulsion provided in this way was poured into a Teflon mold and cured as indicated in example 2.

Details of examples 1 to 3 may be found in table 1.

Examples 1 and 2 are according to the invention.

Example 3 serves for comparison.

Provision of Specimens

To produce the test specimens for compressive strength measurements, appropriate silicone molds coated with the mold release agent T3 (from Ebalta) were used. The plates for the thermal conductivity measurement were produced in a Teflon mold coated with the mold release agent Loxiol G40 (from Cognis). The casting compositions were covered until removed from the mold, but not closed so as to be airtight. The test specimens were removed from the mold after 48 hours, and drying required about 48 hours at 55° C.

Thermal Conductivity Measurement

The thermal conductivity was measured in accordance with ISO 8301; this corresponds to the heat flow measurement method. The plate dimensions were 150 mm×150 mm, and the layer thickness varied from 20 mm to 25 mm. A measuring apparatus model HFM 436/3/1E from NETZSCH was used for the measurement, and the contact pressure was 65N. The measurement temperature chosen was 10° C. with a temperature difference of 20 K. This is a standard measurement for thermal insulation materials. The plates were dried at room temperature for 7 days and subsequently after-dried at 55° C. to constant mass. The samples were stored at room temperature for at least 72 hours before the measurement; special storage under standard conditions did not take place.

Determination of Compressive Strengths

The measurement of the compressive strengths was carried out by a method based on DIN 53452 or 53454. Storage under standard conditions did not take place. The change in geometry of the test specimens could not be predicted accurately and was therefore not taken into account. A universal testing machine from Instron, model 5565 with the software Bluehill 2.0, was used as measuring instrument. Cylindrical test specimens having the dimensions 27 mm height and 12 mm diameter were used for the compressive tests. The test speeds may be found in the DIN standards. Curing was carried out at 55° C.

TABLE 1

| | Examples: | | |
|---|---|---|---|
| | Example 1 | Example 2 | Comparative example 3 |
| Hardener H1 [g] | 88.0 | 190.0 | 255.0 |
| Chem Res E20 [g] | 79.8 | 172.4 | 231.2 |
| Nanofoam, 15% solids from example 1 | — | 85.9 | — |
| Water, d.i. [g] | — | 391.2 | — |
| Water, d.i. + 1% of Bentone EW [g] | 716.1 | 592.0 | 794.5 |
| Binder content [%] | 15.0 | 26.0 | 30.0 |
| Drying temperature | 55° C. | 55° C. | 55° C. |
| Density [g/cm$^3$] | 0.18 | 0.26 | 0.33 |
| Thermal conductivity [W/m*K] | 0.037 | 0.044 | 0.052 |
| Max. compressive stress Average [MPa] | 0.32 | n.d. | 1.6 |

Notes:
(1) The line "binder content" serves merely for information. The binder here is simply the reaction product of hardener H1 and epoxy resin (Chem Res E20). The binder content is accordingly the percentage of the binder defined in this way in the total system. The calculation of the binder content for example 1 may be demonstrated by way of example: Since the reaction of epoxy resin with amine hardener (hardener H1) proceeds as a polyaddition without elimination of parts of molecules, the proportions by mass of resin and hardener are to be added up in order to obtain the amount of the resulting binder: The epoxy resin Chemres E 20 used is to be taken into account on a 100% basis (79.8 g). Since the hardener H1 used has a solids content of 60%, only 0.6 × 88.0 g = 52.8 g of this has to be taken into account. This gives the amount of binder in the system as 52.8 g + 79.8 g = 132.6 g. The total system additionally comprises 716.19 g of water, and accordingly comprises a total amount of 88.0 g + 79.8 g + 716.1 g = 883.9 g. The proportion of binder in the total system is thus as follows: % of binder = 132.6 × 100 / 883.9 = 15.00%.
(2) n.d. means "not determined"
(3) d.i. means "deionized"

The invention claimed is:

1. A method of thermally insulating in transport means or in industrial and plant construction, the method comprising obtaining a nanoporous polymer foam (NP1) by reacting one or more epoxy resins (E) with one or more amphiphilic epoxy resin hardeners (H) in water in a phase inversion polymerization to form a binder, with the proviso that a binder content during the polymerization is in the range from 15 to 39.9% by weight; and installing the nanoporous polymer foam as a thermal insulation material in transport means or in industrial and plant construction.

2. The method according to claim 1, further comprising obtaining the one or more amphiphilic epoxy resin hardeners (H) by reacting a mixture comprising:
   (A) at least one epoxidized polyalkylene oxide selected from the group consisting of epoxidized polyethylene oxides, epoxidized polypropylene oxides and polyethylene-propylene oxides,
   (B) at least one epoxidized aromatic hydroxyl compound selected from the group consisting of bisphenol A epoxides and bisphenol F epoxides and
   (C) at least one aromatic hydroxyl compound selected from the group consisting of bisphenol A and bisphenol F
   to form an intermediate and subsequently reacting this intermediate with a polyamine (P).

3. The method according to claim 2, wherein the polyamine (P) comprises diethylenetriamine.

4. The method according to claim 2, wherein the at least one epoxidized polyalkylene oxide comprises an epoxidized polypropylene oxide.

5. The method according to claim 2, wherein the at least one epoxidized aromatic hydroxyl compound comprises a bisphenol A epoxide.

6. The method according to claim 2, wherein the at least one aromatic hydroxyl compound comprises bisphenol A.

7. The method according to claim 1, wherein a pulverulent nanoporous polymer foam (NP2) is added during the phase inversion polymerization in the step of obtaining the nanoporous polymer foam (NP1), wherein the pulverulent nanoporous polymer foam (NP2) can be obtained by reaction of one or more epoxy resins (E) with an amphiphilic epoxy resin hardener (H) in water in a phase inversion polymerization and subsequent conversion into powder form.

8. A nanoporous polymer foam (NP1) obtained by reacting one or more epoxy resins (E) with one or more amphiphilic epoxy resin hardeners in water in a phase inversion polymerization, wherein a pulverulent nanoporous polymer foam (NP2) is introduced during the phase inversion polymerization in the production of the nanoporous polymer foam, where the pulverulent nanoporous polymer foam (NP2) is obtained by reaction of one or more epoxy resins (E) with an amphiphilic epoxy resin hardener (H) in water in a phase inversion polymerization to form a binder and subsequent conversion into the powder form, with the proviso that a binder content during the polymerization of NP2 is in the range from 15 to 39.9% by weight.

9. The nanoporous polymer foam according to claim 8 further comprising one or more additives, wherein the one or more additives are selected from the group consisting of flame retardant additives, hydrophobicizing agents, and biocides, which are integrated into the nanoporous polymer foam.

10. The method of claim 1, wherein the nanoporous polymer foam has a thermal conductivity of 0.06 W/m*K or less and a maximum compressive stress of 0.3 MPa or above.

11. The nanoporous polymer foam of claim 8 having a thermal conductivity of 0.06 W/m*K or less and a maximum compressive stress of 0.3 MPa or above.

12. The method of claim 1, wherein the item is used in transport means and is selected from the group consisting of automobiles, ships, aircraft, and rail vehicles.

13. The method of claim 1, wherein the item is used in industrial and plant construction and is selected from the group consisting of containers, vessels, pipes, heating systems, and solar plants.

\* \* \* \* \*